March 15, 1960 L. R. ZIFFERER 2,928,149
APPARATUS AND METHOD FOR CURING A FORMED GRANULAR ARTICLE
Filed April 10, 1957 2 Sheets-Sheet 1
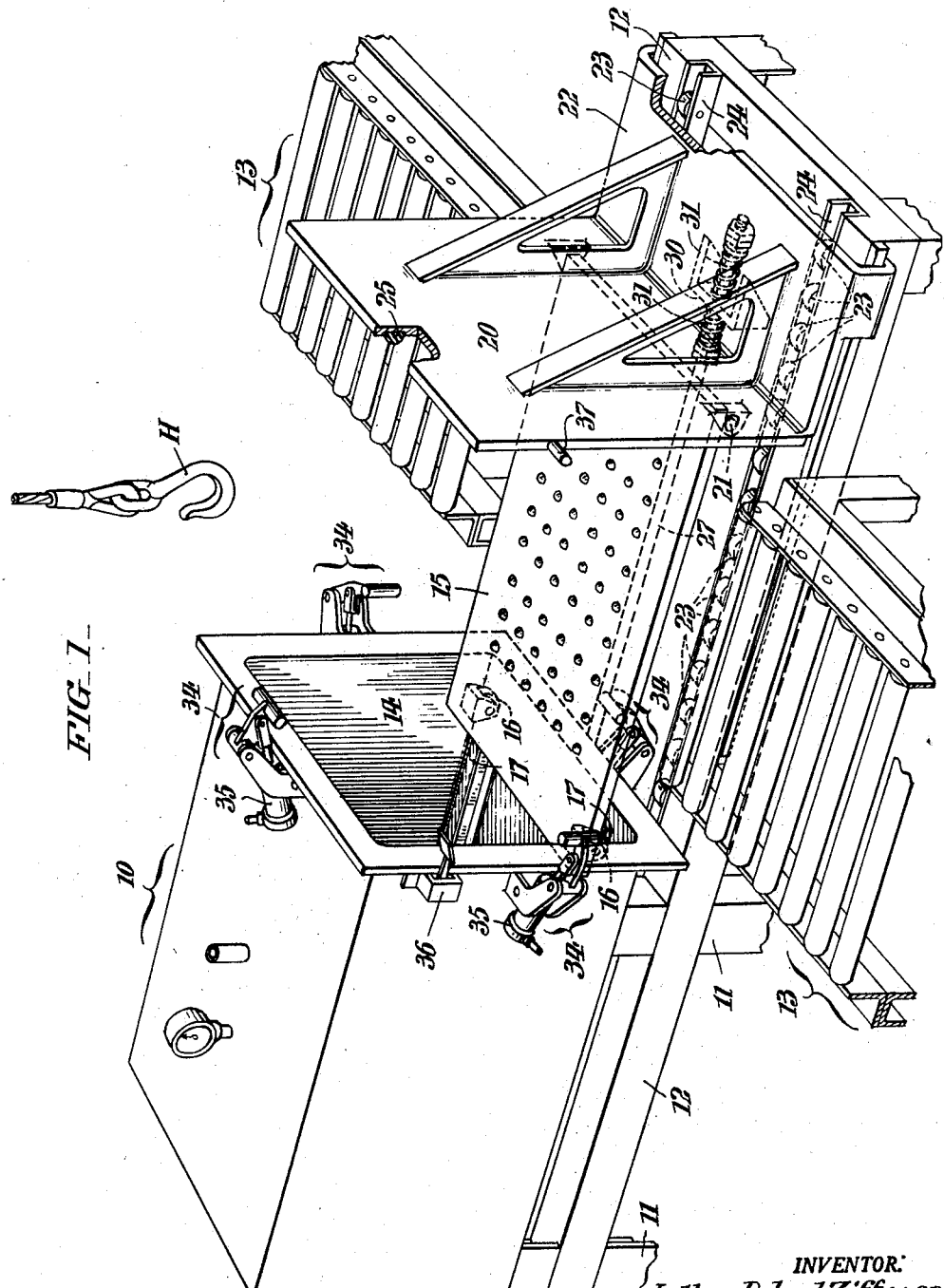
FIG_1_
INVENTOR:
*Lothar Robert Zifferer,*
BY *Paul & Paul*
ATTORNEYS

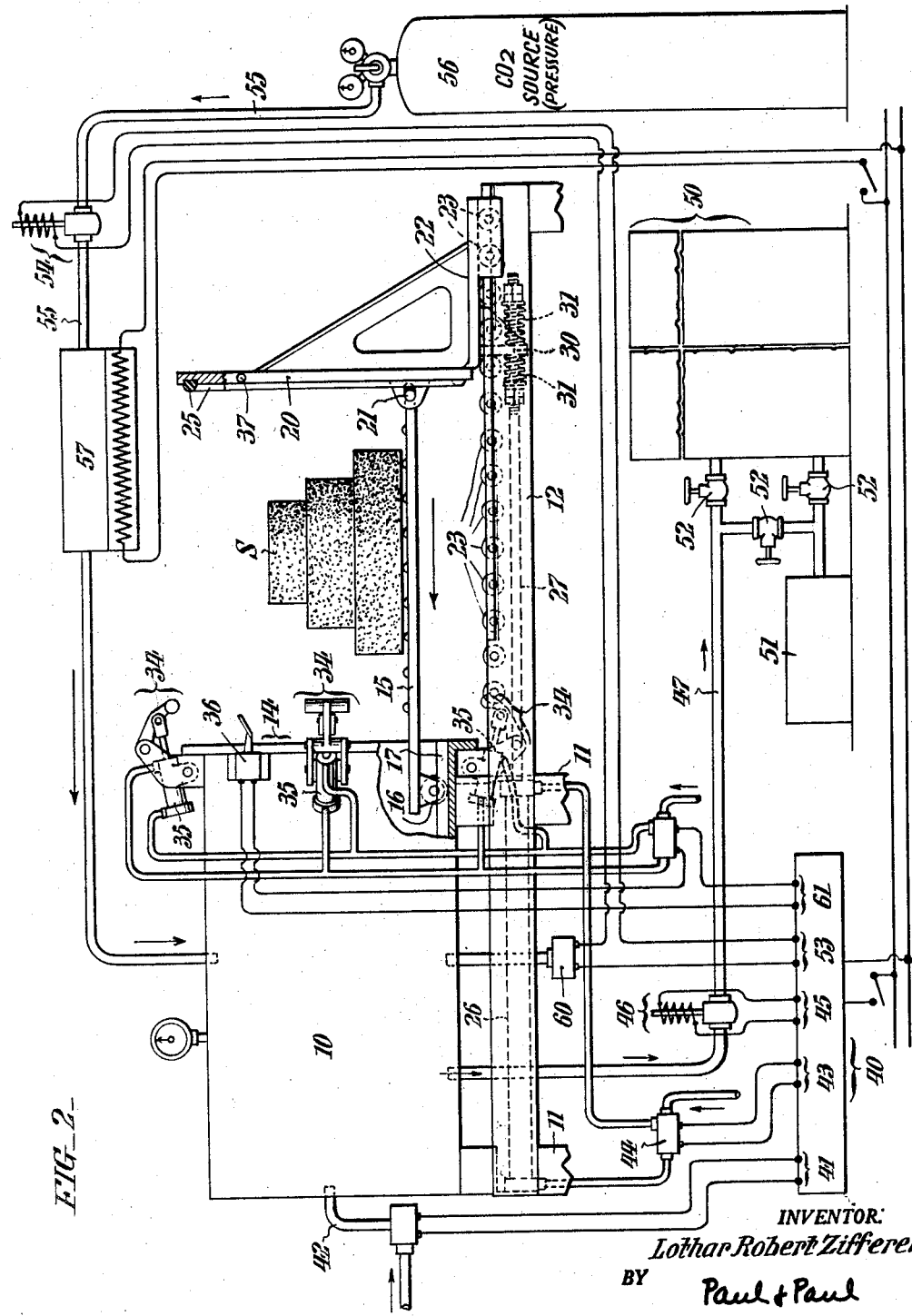

United States Patent Office 2,928,149
Patented Mar. 15, 1960

2,928,149
APPARATUS AND METHOD FOR CURING A FORMED GRANULAR ARTICLE

Lothar R. Zifferer, Glen Rock, Pa.

Application April 10, 1957, Serial No. 651,929

1 Claim. (Cl. 22—87)

This invention relates to an apparatus and method for curing or setting a molded granular article. More particularly, this invention relates to an apparatus particularly constructed for the curing of rather large molded granular materials such as molds, cores, ladle linings or the like, used in foundry operations and herein collectively referred to as sand forms. This invention also relates to a method of curing sand forms of the foregoing character, by alternate application of carbon dioxide and vacuum, wherein the carbon dioxide pressure is maintained below atmospheric pressure and wherein a special form of apparatus is applied for carrying this method into effect.

It has become conventional to cure sand forms by mixing the sand with water glass (sodium silicate), forming the resulting mixture to a desired shape, and applying carbon dioxide under pressure into the resulting molded product. The carbon dioxide reacts chemically with the water glass, producing a silica gel which securely holds the granular particles together.

In my co-pending patent application Serial No. 608,096, filed September 5, 1956, now Patent 2,824,345 issued Feb. 25, 1958, I have disclosed an apparatus and method for curing a sand form, wherein the sand form is deposited in a container, a relatively high vacuum is applied, carbon dioxide is introduced into the container under pressure, and the vacuum and carbon dioxide steps are repeated. The repetition of these steps is an important and advantageous feature, since it results not only in a much faster cure but a much more complete one as well.

It has now been discovered that particularly advantageous results are obtained by applying a vacuum to the sand form, then admitting carbon dioxide but limiting the extent of such admission to the point that the maximum carbon dioxide pressure is less than atmospheric pressure, then repeating the evacuation and again repeating the carbon dioxide introduction, again limiting the carbon dioxide pressure to a value below atmospheric pressure. At the conclusion of these steps, air is applied under a pressure slightly greater than atmospheric pressure, in order to open the container so that access may be had to the cured article.

It is accordingly an object of this invention to provide a new process for curing a sand form, which produces a better product under optimum operating conditions. Still another object of this invention is to provide a novel form of apparatus for curing sand forms, particularly sand forms which are quite large in size. Still another object is to provide an improved apparatus which more readily handles considerable quantities of rather large articles which are to be molded and cured. Other objects and advantages of this invention, including the simplicity and economy of the same, will further become apparent hereinafter and in the drawings, of which:

Fig. 1 is a perspective view showing one preferred form of the apparatus in accordance with this invention, showing the container open and in a position to receive a charge for performing the curing operation.

Fig. 2 is a side elevation view of the apparatus shown in Fig. 1, also showing diagrammatically the automatic controlling apparatus for regulating the operation of the process.

Although the drawings disclose a specific form of the invention, it will be appreciated that various other forms of apparatus and method may be used. The specific terms of the specification which follows are intended to describe the specific form of the apparatus shown in the drawings, and are not intended to limit the scope of the invention, which is defined in the appended claim.

Turning now to the specific embodiment of the invention selected for illustration in the drawings, the number 10 designates a large, horizontally arranged chamber in which the curing takes place. The chamber 10 is supported on a plurality of legs 11 to which is attached a pair of elongated horizontal supports 12. A conveyor 13 is horizontally arranged across the supports 12, extending in front of the open forward end 14 of the chamber 10.

The number 15 designates a support plate on which sand forms are placed in order to introduce them into the chamber 10. The support plate 15 is mounted on wheels 16 which travel in channels 17 within the chamber 10. At the opposite end of the support plate 15, a door 20 is pivoted by a pivot rod 21, which permits a slight swinging movement of the door 20 with respect to the support plate 15. Door 20 is supported on a horizontal slide plate 22 which rides upon a plurality of aligned rollers 23 mounted in channels 24 extending along the supports 12. It will accordingly be appreciated that the door 20 is horizontally reciprocable toward and away from the open end 14 of the chamber 10, to close and to open the chamber. The door 20 is provided with a rubber gasket or O-ring 25 which contacts the open face of the container 10 to seal the container in a closed condition.

Means are provided for causing the reciprocating movement of the door 20 toward and away from the chamber 10. This means includes a long, small diameter cylinder 26 which is fixed beneath the chamber 10 (see particularly Fig. 2), and which has a piston 27 extending through a hole in a downwardly extending plate 30 which is fixed to the slide plates 22 of the door 20. At each side of the plate 30 a helical spring 31 is provided, and the springs 31 are secured in position by locknuts, as shown. The springs 31 provide a cushioning action at the end of the closing movement of the door 20, and also provide a cushioning action when the door 20 is opened.

Means are provided for latching the door 20 in its closed position. This means includes four latches 34, each of which is automatically operated by means of an air cylinder 35, as will be described in further detail hereinafter. The latches 34 are automatically actuated by means of a microswitch 36 which is mounted on the side of the chamber 10 adjacent the open end thereof, which in turn is actuated by a small rod 37 carried on the door 20. When the door 20 is closed, rod 37 contacts the arm of micro-switch 36, throwing the switch 36, and this in turn operates the air cylinders 35 in a manner which will further become apparent hereinafter.

Turning now to Fig. 2 of the drawings, the connections of the various parts of the apparatus will be apparent, as well as the method of curing the sand form in accordance with this invention. The number 40 designates an automatic electric timer of any conventional design, having a conventional mechanism which opens and closes a plurality of electric switches alternately and in a predetermined sequence. One such switch operates a circuit 41 which causes air to be introduced at a pressure slightly above atmospheric pressure through a pipe 42 into the chamber 10. Another such switch opens a circuit 43 which is connected to operate an air valve 44 in order to introduce air either forwardly or rearwardly into the cylinder 26, in order to cause reciprocation of piston 27. Another such switch actuates a circuit 45 which is connected to a solenoid valve 46 for causing the application of a vacuum to the chamber 10, such vacuum being applied by a vacuum line 47 connected to an accumulator tank 50 and to a vacuum pump 51. The accumulator tank 50 and vacuum pump 51 are connected by a plurality of valves 52, as shown in the drawing.

Another switch of the timer 40 operates a circuit 53 which is connected to a carbon dioxide control valve 54 disposed in a carbon dioxide feed line 55 leading from a carbon dioxide source 56. The pipe 55 extends through a heat exchanger 57 into the chamber 10. The number 60 designates a pressure switch connected into the carbon dioxide actuating circuit, which functions to close off the carbon dioxide control valve when the pressure of carbon dioxide reaches a predetermined maximum within the chamber 10.

The timer 40 actuates another switch which controls a circuit 61 which is connected to the micro-switch 36 and to the air cylinders 35, causing automatic operation of the latches 34 as heretofore described, in response to the closing of the door 20.

The operation of the apparatus is as follows. The operator places one or more sand forms S upon the raised protuberances on the surface of the support plate 15, and the timer 40 is started. The circuit 43 is closed, causing air to flow into the cylinder 26 to draw the piston 27 toward the chamber 10, thereby closing the door 20. Because of the low pressure of air which is used and the small diameter of the cylinder 26, the maximum force exerted by the door 20 is quite small and would be insufficient to cause any damage to the operator's hand if it should be inserted between the door 20 and the open end 14 of the container 10. As the door 20 closes, the rod 37 closes the micro-switch 36, which operates through the circuit 61 of the timer to energize the air cylinders 35, thereby closing all of the latches 34. The timer 40 then actuates the circuit 45, and a vacuum of about 25–29.9 inches of mercury is drawn. After a predetermined time, the circuit 45 is operated by the timer 40 to close the valve 46, and the circuit 53 actuates the valve 54, admitting heated carbon dioxide into the chamber 10. The pressure switch 60 is preferably adjusted to limit the carbon dioxide pressure to about minus 3 pounds per square inch (about 11 to 12 pounds per square inch absolute). After a suitable time of curing at this pressure, the timer closes the carbon dioxide valve 54 and reopens the vacuum valve 46, whereupon a vacuum of about 25–29.9 inches of mercury is again drawn. After a suitable time, the timer 40 closes the switch 46 and opens the carbon dioxide valve 54, again admitting carbon dioxide to a pressure of about 11 to 12 pounds per square inch absolute, this pressure again being controlled by the pressure switch 60. After a suitable time, the timer 40 operates the circuit 53 to close the valve 54, and then operates the circuit 41 to admit air through the line 42, at the same time operating the circuit 61 to open the latches 34. When the air through the line 42 reaches a value slightly above atmospheric pressure, it pushes the door 20 open, and the valve 44 is then automatically actuated through the circuit 43 to cause the cylinder 26 to complete the opening movement of the door 20, exposing the cured sand forms S.

It will accordingly be appreciated that an automatic method and apparatus are provided for curing a sand form, which is safe in its operation and which need not be constructed of heavy material to withstand internal pressures. The curing process is carried out in its entirety at a pressure below atmospheric, and this not only results in a very substantial saving of initial investment in the apparatus but also assures safety at all times. Moreover, the specific method of this invention, wherein a negative carbon dioxide pressure is applied to the sand forms, produces curing of superior quality as compared to hand gassing and greatly facilitates the operation of the curing process. Preferably, in carrying the invention into effect, the vacuum at each stage of the process is within the range of 25–29.9 inches of mercury, and the carbon dioxide pressure is in the range of about minus 3 pounds per square inch to atmospheric pressure or just below. Accordingly, the absolute pressure of carbon dioxide ranges from about 11 pounds per square inch to about 14.7 pounds per square inch absolute.

In a large apparatus, which might measure 6 feet on each side for example, even an extremely small pressure of approximately 2 pounds per square inch above atmospheric, would exert an exceedingly great force (approximately 76,000 lbs.) against the door 20 and would require a heavy door and a large number of heavy, expensive latches. This invention accordingly has the still further advantage that a large curing apparatus may be provided without the danger of excessive pressure or excessive force resulting from a relatively small pressure.

Another advantage of this invention resides in the convenience of arrangement of the door 20 with respect to the opening 14 and the support plate 15. With this arrangement uninterrupted free space is provided at the sides and top of the plate 15 for handling sand forms, which may be transported on the incoming and outgoing conveyors 13 or by lifting and lowering a hook H, for example.

The connection and arrangement of the accumulator tank 50 has the advantage that the use of the accumulator can materially shorten the machine cycle time when curing certain types of work. When an exceptionally hard cure is needed, the terminal vacuum of the pump may be utilized, and this vacuum is higher than that attained by using the accumulator. When the vacuum pump is used directly, the settings on the automatic timer are changed to provide a longer time for the vacuum stages of the machine cycle.

Although this invention has been described with reference to a specific form thereof, it will be appreciated that various modifications may be made without departing from the scope of this invention. For example, equivalent elements may be substituted for those specifically shown and described, parts may be reversed, and certain features of the invention may be used independently of the use of other features, all within the spirit and scope of this invention as defined in the appended claim.

Having thus described my invention, I claim:

Apparatus for curing a sand form comprising a curing chamber closed at its top and bottom and having an opening at one side thereof, said chamber opening having a facing surface extending entirely around the periphery thereof, a sand form-supporting member reciprocably mounted for movement into and out of said curing chamber, an upright door connected for reciprocation with said member to open and close said opening, said door cooperating with said facing surface to form a seal extending completely around said chamber opening, automatic timing means coordinated with the closing of said door for causing a vacuum to be drawn within said curing chamber, automatic timing means, evacuating means connected for actuation from said timing means for introducing form-curing gas into said chamber after such evacuation, pressure switch means connected to said chamber and arranged to shut off the form-curing gas supply when the form-curing gas pressure reaches a maximum value which is below atmospheric pressure, and valve means connected to said chamber for bringing the internal chamber pressure to a value of at least atmospheric pressure, prior to the opening of the door.

References Cited in the file of this patent

UNITED STATES PATENTS

| | | | |
|---|---|---|---|
| 227,451 | Scott | May 11, | 1880 |
| 591,168 | Heinzerling | Oct. 5, | 1897 |
| 730,346 | Corbett | June 9, | 1903 |
| 825,088 | Thom | July 3, | 1906 |
| 876,783 | Dresler | Jan. 14, | 1908 |
| 898,703 | Thom | Sept. 15, | 1908 |
| 916,069 | Wadsworth | Mar. 23, | 1909 |
| 1,165,306 | Allen et al. | Dec. 21, | 1915 |
| 1,165,542 | Schnerre | Dec. 28, | 1915 |
| 1,853,061 | Judelson | Apr. 12, | 1932 |
| 2,112,310 | Schultz | Mar. 29, | 1938 |
| 2,294,530 | Wiese | Sept. 1, | 1942 |
| 2,351,482 | Campbell | June 13, | 1944 |
| 2,391,855 | Bean | Dec. 25, | 1945 |
| 2,547,323 | Hener | Apr. 3, | 1951 |
| 2,798,265 | Rubovitz et al. | July 9, | 1957 |
| 2,824,345 | Zifferer | Feb. 25, | 1958 |